(12) United States Patent
Srikant

(10) Patent No.: US 6,882,787 B2
(45) Date of Patent: Apr. 19, 2005

(54) FIBER PROFILE FOR ACHIEVING VERY HIGH DISPERSION SLOPE

(75) Inventor: Vaidyanathan Srikant, Evanston, IL (US)

(73) Assignee: Corning Incorporated, Corning, NY (US)

(*) Notice: Subject to any disclaimer, the term of this patent is extended or adjusted under 35 U.S.C. 154(b) by 437 days.

(21) Appl. No.: 10/037,221

(22) Filed: Nov. 9, 2001

(65) Prior Publication Data

US 2002/0102084 A1 Aug. 1, 2002

Related U.S. Application Data

(60) Provisional application No. 60/254,908, filed on Dec. 12, 2000.

(51) Int. Cl.⁷ ................................ G02B 6/02
(52) U.S. Cl. .................................... 385/127
(58) Field of Search ............................. 385/123–127

(56) References Cited

U.S. PATENT DOCUMENTS

| | | | |
|---|---|---|---|
| 5,781,673 A | 7/1998 | Reed et al. | 385/24 |
| 5,995,694 A | 11/1999 | Akasaka et al. | 385/123 |

FOREIGN PATENT DOCUMENTS

| | | | | |
|---|---|---|---|---|
| GB | 0940697 | 9/1999 | | G02B/6/10 |
| JP | WO 00/17685 | 3/2000 | | G02B/6/16 |
| JP | WO 00/70378 | 11/2000 | | G02B/6/22 |
| WO | WO 01/25828 | 4/2001 | | G02B/6/00 |
| WO | WO 01/92928 | 12/2001 | | G02B/6/00 |

OTHER PUBLICATIONS

Gruner–Nielsen et al., "Dispersion Compensating Fibers", Optical Fiber Technology, vol. 6, No. 2, Apr. 2000, pp. 165–168.

*Primary Examiner*—Euncha Cherry
(74) *Attorney, Agent, or Firm*—William J. Chervenak; Randall S. Wayland

(57) ABSTRACT

A dispersion slope compensating optical waveguide, such as a fiber, having a high negative dispersion slope is provided. The optical waveguide comprises a core region and an clad layer. The core region further comprises a first region and a second region surrounding the first region. The width of the second region is sufficient to confine electromagnetic radiation within a selected wavelength range to substantially only the core region. Thus, bending loss in the waveguide is substantially reduced. The negative dispersion slope of the dispersion slope compensating optical waveguide can be used in conjunction with a dispersion compensating optical waveguide as a dual optical waveguide to compensate both the dispersion and dispersion slope of a transmission waveguide. An optical span and an optical transmission system incorporating the dual optical waveguide is also provided.

31 Claims, 7 Drawing Sheets

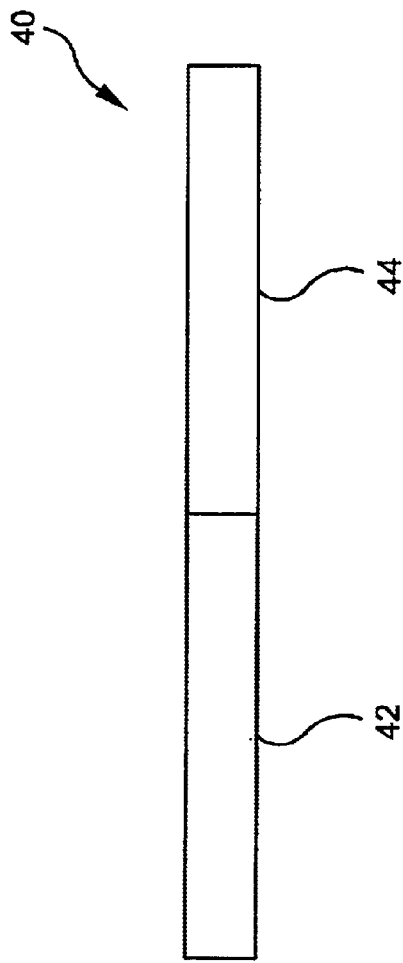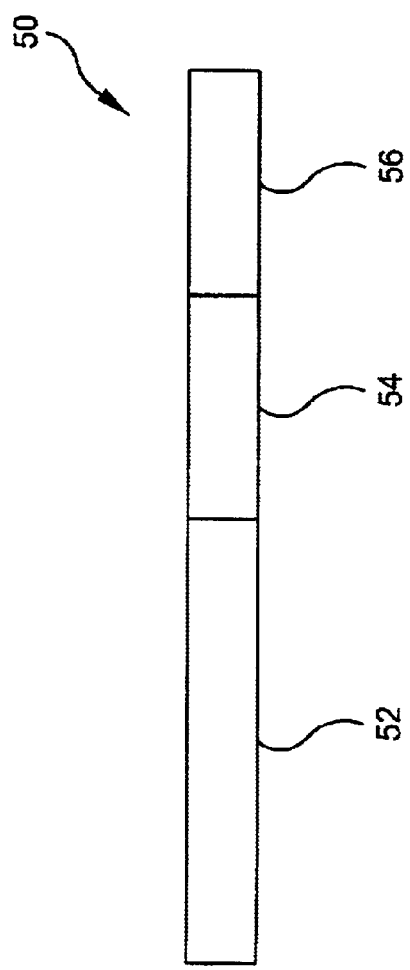
FIG. 7
FIG. 8

FIBER PROFILE FOR ACHIEVING VERY HIGH DISPERSION SLOPE

PRIORITY DOCUMENT

This application claims the benefit of and priority to U.S. Provisional Patent Application No. 60/254,908, filed Dec. 12, 2000.

FIELD OF INVENTION

This invention relates to a dispersion slope compensating optical waveguide having a high negative dispersion slope. This invention also relates to a dual optical waveguide, optical waveguide span, and optical transmission system incorporating the dispersion slope compensating optical waveguide.

BACKGROUND OF THE INVENTION

In long-haul optical networks, nonlinear optical effects can degrade the optical signal transmission. Such nonlinear optical effects include four-wave mixing (FWM) and Cross-Phase Modulation (XPM). Introducing dispersion in an optical fiber can reduce such nonlinear effects.

The dispersion product or accumulated dispersion of a span of fiber is a measure of the dispersion accumulated over the span. The dispersion product for a fiber of length L with a dispersion D is the product of L and D, i.e., L•D. Thus, the dispersion product of a span of fiber having individual sections of length $L_i$ and dispersion $D_i$ is the sum of the individual dispersion products $\Sigma L_i \cdot D_i$. Dispersion units are typically given as picoseconds/nanometer-kilometer (ps/nm-km), where the kilometer units correspond to the length of the fiber.

Optical transmission systems must periodically compensate for the accumulated dispersion. Compensation is typically accomplished by periodically inserting a section of dispersion compensating fiber (DCF) between the sections of transmission fiber to reduce the accumulated dispersion.

A scheme that compensates for accumulated dispersion should also compensate for the dispersion slope. Many optical transmission systems operate according to transmission schemes, such as wavelength division multiplexing (WDM), using multiple transmission wavelengths to increase the overall bandwidth of the transmission. The system transmits over a band of several channels, each channel transmitted at a different wavelength within a range of transmission wavelengths. In general, dispersion is wavelength dependent and will be different for each of the channels. Thus, any reasonable scheme for compensating dispersion in a multiple wavelength transmission scheme should take care to compensate the dispersion slope, S, i.e., the change in dispersion per unit wavelength. The units of dispersion slope are typically given as picoseconds/(nanometer)$^2$-kilometer (ps/nm$^2$-km).

To compensate for both dispersion $D_T$ and dispersion slope $S_T$ of the transmission fiber certain conditions must be satisfied. To understand the requirements for dispersion $D_{DC}$ and dispersion slope $S_{DC}$ of a DCF, it is usefull to consider a typical terrestrial transmission system with a length $L_T$ of transmission fiber and a length $L_{DC}$ of DCF between optical amplifiers. The transmission system transmits over multiple channels with a center channel having a center wavelength λC. In this case, the dispersion $D_T$ of the transmission fiber must be compensated by the DCF. Accordingly, the following condition must be satisfied, $D_{DC}(\lambda_C) \cdot L_{DC} = -D_T(\lambda_C) \cdot L_T$. Additionally, the dispersion slope $S_T$ of the transmission fiber must be compensated by the dispersion slope $S_{DC}$ of the DCF. Accordingly, a second condition must be also satisfied, $\kappa_{DC}(\lambda_C) = (D_{DC}/S_{DC}) = \kappa_T(\lambda_C) = (D_T/S_T)$.

One transmission fiber finding increased use in optical transmission systems is LEAF (large effective area fiber). LEAF typically has a κ value of approximately 50. It has been difficult to design a DCF to compensate for the low κ value of a LEAF. A number of schemes have been put forth to achieve compensation of LEAF fibers. For example, higher order dispersion compensating devices, dispersion compensating gratings, and photonic crystal fiber have all been proposed. Each of these solutions has problems and faces different technological issues. In addition, the use of dual fiber dispersion compensation has also been proposed. In dual fiber dispersion compensation, the dispersion and dispersion slope are compensated in separate fibers, i.e., dual fibers. However, dual fiber dispersion compensation has not found a lot of acceptance to date in part due to the difficulty in designing the dispersion slope compensating fiber.

BRIEF SUMMARY OF THE INVENTION

An advantage can be achieved for compensating low K value transmission fibers, such as LEAF, by dual fiber compensation including a fiber with high negative dispersion. Decoupling dispersion slope compensation and dispersion compensation into separate fibers provides a much greater flexibility in choosing such fibers for a particular application. Various lengths of the fiber in the dual fiber arrangement may be combined and full dispersion and dispersion slope compensation may be readily achieved for a wide variety of transmission fibers. This obviates the need to develop transmission fiber dependent upon a particular single dispersion compensating fiber.

Another advantage can be achieved by including a wide ring in the core region of the high negative dispersion optical fiber that tends to restrict propagating electromagnetic radiation modes to the more central regions of the core and thus reduces bending loss due to the cladding.

According to a first embodiment of the invention, a dispersion slope compensating optical waveguide having a negative dispersion slope is provided. The dispersion slope compensating optical waveguide comprises a core region and a clad layer. The core region comprises a first region and a second region. The second region surrounds the first region and has a width sufficient to confine electromagnetic radiation within a selected wavelength range to substantially only the core region. The negative dispersion slope of the dispersion slope compensating optical waveguide is in the range of $-2$ ps/nm$^2$-km to $-40$ ps/nm$^2$-km over the selected wavelength range.

According to a second embodiment of the invention, another dispersion slope compensating optical waveguide having a negative dispersion slope is provided. The dispersion slope compensating optical waveguide comprises a core region having a central axis and a clad layer. The core region comprises a central segment, a moat segment, and a ring segment, where each segment has an outer radius and an axis collinear with a central axis of the core region, and the moat and ring segments each have an inner radius. The central segment is located about the core central axis and has a relative index $\Delta_c\%$. The moat segment is located about the central segment and has a relative index $\Delta_m\%$ opposite in sign to the relative index $\Delta_c\%$ of the central segment. The ring segment is located about the moat segment and has a relative index $\Delta_r\%$ of the same sign as the relative index $\Delta_c\%$ of the central segment. The difference between the ring segment outer radius and the ring segment inner radius is sufficient to confine electromagnetic radiation within a selected wavelength range to substantially only the core region. The negative dispersion slope is in the range of −2 ps/nm$^2$-km to −40 ps/nm$^2$-km over the selected wavelength range.

According to another embodiment of the invention, a dual optical waveguide is provided. The dual optical waveguide comprises a dispersion slope compensating optical waveguide, such as one of the waveguides in the first or second embodiment. The dual optical waveguide also comprises a dispersion compensating optical waveguide. The dispersion slope compensating optical waveguide is arranged in series with and optically coupled to the dispersion compensating optical waveguide.

According to another embodiment of the invention, an optical waveguide span is provided. The optical waveguide span comprises a dispersion slope compensating optical waveguide, such as one of the waveguides in the first or second embodiment. The optical waveguide span also comprises a dispersion compensating optical waveguide and a transmission waveguide. The dispersion slope compensating optical waveguide is arranged in series with and optically coupled to the dispersion compensating optical waveguide. The dispersion compensating optical waveguide is arranged in series with and optically coupled to the transmission waveguide.

According to another embodiment of the invention, an optical transmission system is provided. The optical transmission system comprises a dispersion slope compensating optical waveguide, such as one of the waveguides in the first or second embodiment. The optical transmission system also comprises a dispersion compensating optical waveguide, a transmission waveguide, a transmitter and a receiver. The dispersion slope compensating optical waveguide is arranged in series with and optically coupled to the dispersion compensating optical waveguide. The dispersion compensating optical waveguide is arranged in series with and optically coupled to the transmission waveguide. The transmitter is optically coupled to the transmission waveguide, and the transmitter launches an optical signal into the transmission waveguide in a selected wavelength range.

The receiver is optically coupled to the dispersion slope compensating waveguide, and the receiver receives the optical signal from the dispersion slope compensating optical waveguide.

BRIEF DESCRIPTION OF THE DRAWINGS

FIG. 7 is a side view of another embodiment of the invention showing a dual optical waveguide.

FIG. 8 is a side view of another embodiment of the invention showing an optical waveguide span.

DETAILED DESCRIPTION OF PREFERRED EMBODIMENTS OF THE INVENTION

In dual fiber dispersion compensation, broadband dispersion compensation is achieved by essentially decoupling dispersion compensation from dispersion slope compensation. This is achieved by designing two fibers, one that accounts for dispersion compensation and the other that accounts for dispersion slope compensation. In order to achieve a low κ value, the dispersion slope compensating fiber should have a high negative dispersion slope. Under the constraints of conventional design rules it is believed that in order to make fibers that exhibit large negative dispersion slopes, the fiber must be designed very close to the cutoff of the fundamental mode. In this case the fiber is very bend sensitive and it is difficult to propagate the fundamental mode through large distances. This is the primary reason that dual fiber dispersion compensation has not been seriously considered for making any practical dispersion compensating devices.

The inventors of the present invention have discovered it is possible to fabricate fibers with the required large negative dispersion slopes and at the same time make the fibers less bend sensitive. In particular, the present invention makes a fiber less bend sensitive by decreasing the amount of light that travels in the cladding. The present invention achieves this goal by increasing the effective index of the core while providing a fiber refractive index profile that does not affect the dispersive properties of the core. This is achieved in the present invention within the frame work of a segmented core profile. In this segmented core profile, dispersion properties of a first region of the core are kept about the same, while a second region of the core surrounds the first region and has a width sufficient to confine electromagnetic energy transmitted through the fiber at a selected wavelength to substantially only the core region.

The present invention is particularly applicable to optical fiber systems. However, the present invention is not limited to optical fibers, but is also applicable to optical waveguides generally.

Figure 1:
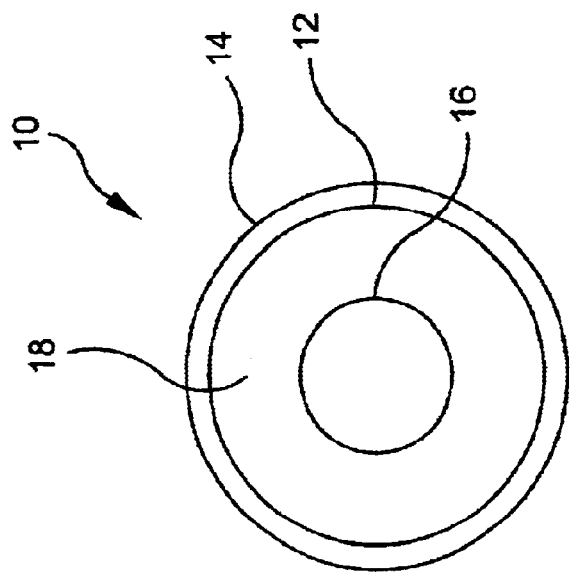
FIG. 1 is a cross-sectional view of a high negative dispersion waveguide according to a first embodiment of the invention.

FIG. 1 illustrates one embodiment of the present invention showing a cross-section of a high negative dispersion waveguide 10. The waveguide 10 includes a core region 12 and clad layer 14. The clad layer surrounds the core region 12 as is well known in the art. The core region 12 comprises a first region 16 and a second region (or ring segment) 18. The second region 18 surrounds the first region 16. The index of refraction profile and the width of the second region 18 are chosen to confine electromagnetic radiation propagating within the waveguide 10 for a selected wavelength range to substantially only the core region 12. Because the electromagnetic radiation is confined substantially to the core region 12, bending losses are substantially reduced.

The waveguide 10 has a circular cross-section. In this case, the core region 12 has a central axis and each of the first region 16 and the second region 18 has an axis collinear with the central axis. However, the present invention is not limited to a waveguide with a circular cross-section. The cross-section of the waveguide 10 may also be square or rectangular or have some other cross-section. In any case, the second region 18 of the core region 12 has a width and refractive index profile sufficient to confine the electromagnetic radiation of interest, i.e., within the selected wavelength range, to substantially only the core region 12.

The width of the second region 18 in the embodiment of FIG. 1 is the difference between the outer and inner radii of the annular cross-sectioned second region 18. The width may be determined differently if the waveguide 10 has a cross-section other than circular. Preferably, the width is in the range of about 2 to about 20 microns. Such a range should facilitate confinement of the electromagnetic to the core. Most preferably, the width is in the range of about 6 to about 20 microns.

The function of the waveguide 10 is to compensate for the dispersion slope of a transmission fiber. In this regard, the waveguide 10 should have a high negative dispersion slope sufficient to provide slope compensation without requiring an overly long length of waveguide. Preferably, waveguide 10 has a negative dispersion slope in the range of $-2$ ps/nm$^2$-km to $-40$ ps/nm$^2$-km over the wavelength range of interest. A most preferred range for the negative dispersion slope is from $-5$ ps/nm$^2$-km to $-26$ ps/nm$^2$-km over the wavelength range of interest.

The wavelength range of interest will depend upon the particular application. A preferred range for transmission is from about 1450 nm to 1700 nm. A most preferred range is from about 1470 nm to 1640 nm. For C-band transmission the wavelength range would be centered at about 1550 nm.

Figure 2:
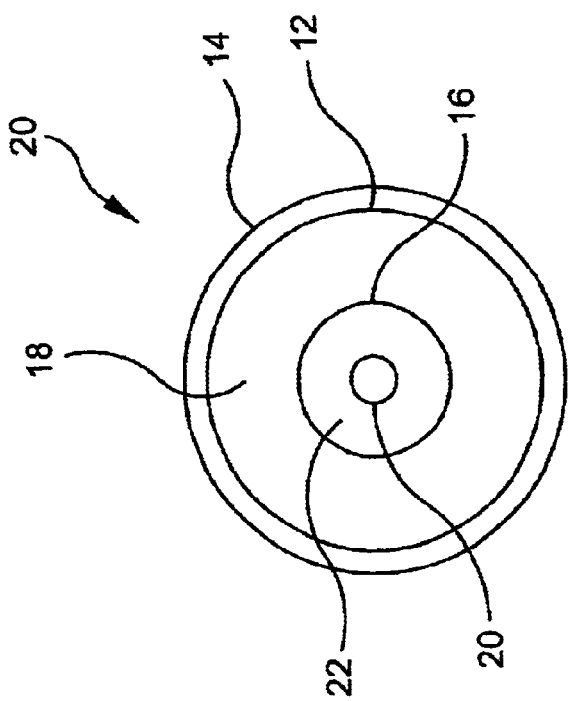
FIG. 2 is a cross-sectional view of a high negative dispersion waveguide according to a second embodiment of the invention.

FIG. 2 illustrates another embodiment of the present invention showing a cross-section of a high negative dispersion waveguide 20. As in the embodiment of FIG. 1, the embodiment of FIG. 2 includes a clad layer 14 and a core region 12 with a first region 16 and a second region (or ring segment) 18. In the embodiment of FIG. 2, the first region 16 includes a central segment 20 and a moat segment 22 surrounding the central segment 20.

The waveguide 20 of the embodiment of FIG. 2 has a circular cross-section. Thus, the central segment 20, moat segment 22 and the ring segment 18 all have an axis that is collinear with the central axis of core 12 and the waveguide 20. Although the embodiment of FIG. 2 shows a circular cross-section, it is contemplated that the waveguide 20 may have other cross-sections such as square or rectangular.

In the embodiment of FIG. 2, the preferred and most preferred ranges for the ring segment width, transmission wavelength and the negative dispersion slope are the same as for the embodiment of FIG. 1. For C-band transmission the wavelength range would be centered at about 1550 nm. Also, in the embodiment of FIG. 2 the index of refraction profile of the ring segment and the width of the ring segment are chosen to confine electromagnetic radiation propagating within the waveguide for a selected wavelength range to substantially only the core region 12.

In this regard, the sign of the relative index, $\Delta\%$, of each of the central segment 20, moat segment 22, and ring segment 18 are chosen to substantially confine the electromagnetic radiation in the core region 12 of the waveguide. The relative index, $\Delta_i\%$, of region i is defined in this application as:

$$\Delta_i\% = 100 \times (n_i^2 - n_c^2)/2n_i^2,$$

where $n_i$ is the maximum refractive index of region i, and $n_c$ is the refractive index of the clad layer 14. To substantially confine the electromagnetic radiation to the core region 12, the central segment relative index $\Delta_c\%$ is chosen to be opposite in sign to the moat segment relative index $\Delta_m\%$ and of a same sign as the ring segment (or second region) relative index $\Delta_T\%$ (or $\Delta_2\%$).

Preferred ranges for central segment relative index $\Delta_c\%$, moat segment relative index $\Delta_m\%$, and ring segment relative index $\Delta_T\%$ is in the range, respectively, of about 0.4% to 0.8%, $-0.5\%$ to $-0.7\%$, and 0.1% to 0.4%. Preferred ranges for the ring segment inner radius, and the difference between the ring segment outer radius and the ring segment inner radius, respectively, are in the range of about 6.5 microns to 12.5 microns, and about 2 to 20 microns. The preferred ranges for the central segment outer radius is in the range of about 3 to 6 microns. The preferred ranges for the difference between the moat segment outer and inner radius is in the range of about 3.5 microns to 6.5 microns. The radii are all measured relative to the waveguide central axis as the center of the circle.

Such refractive index profiles can be made using various techniques known in the art. Optical waveguides in fiber form are preferably made using chemical vapor deposition techniques such as the outside vapor deposition (OVD) process, the vapor axial deposition (VAD) process, or the inside vapor (MCVD) deposition process. The more preferred manufacturing technique for optical fibers is OVD. Conventional dopant materials can be used for doping of silica glass waveguides, such as germania for updoping (raising the index of refraction) and fluorine for down doping (lowering the index of refraction).

The specific refractive index profile of each of the central segment, moat segment and ring segments may have a variety of refractive index profile shapes. For example, the refractive index profiles of each of these segments may have a respective shape that may be a step, a rounded step, a trapezoid, a rounded trapezoid, or an α-profile. An α-profile is given by the equation: $\Delta b_0\% = \Delta\%(b_0)(1-[|b-b_0|/(b_1-b_0)]^\alpha)$, where $b_0$ is the maximum point of the profile and $b_1$ is the point at which $\Delta b_0\%$ is zero and b is in the range $b_i \leq b \leq b_f$, where $\Delta\%$ is defined as above, $b_i$ is the initial point of the α-profile, $b_f$ is the final point of the α-profile, and α is an exponent which is a real number. Approximate α values for the central and moat segments may be about 4.

EXAMPLES

Example 1

Figure 3:
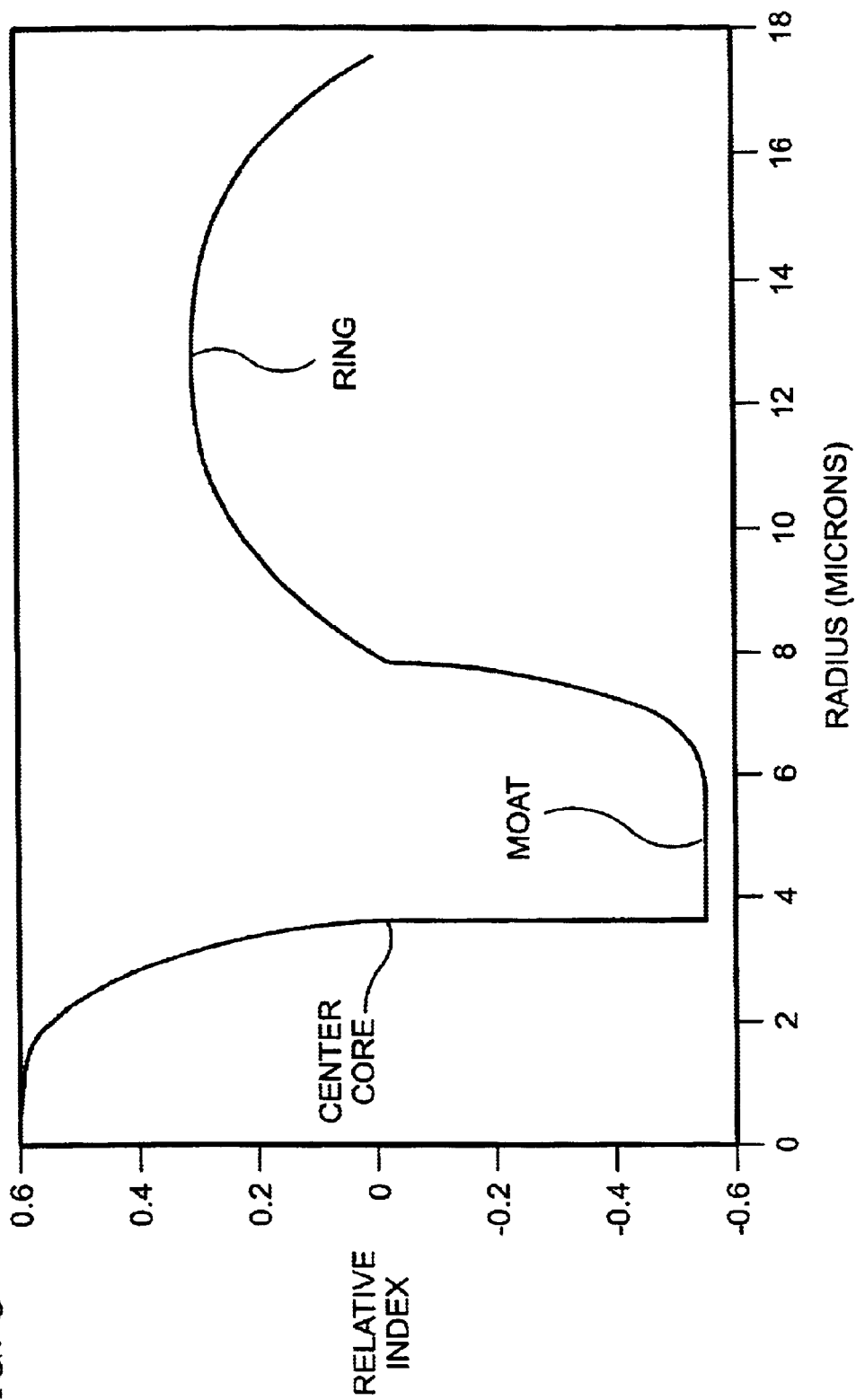
FIG. 3 is a graph showing a relative index profile of a high negative dispersion waveguide according to a first example of the invention.

FIG. 3 is a relative index profile of the core region for Example 1 of the present invention according to the second embodiment of the high negative dispersion slope waveguide. In Example 1, the central segment, moat segment and ring segment outer radii are about 4, 8 and 18 microns, respectively. In this first example, the relative indices of the central segment $\Delta_c\%$, moat segment $\Delta_m\%$ and ring segment $\Delta_T\%$ are about 0.6%, $-0.55\%$ and 0.3%, respectively.

Example 2

Figure 4:
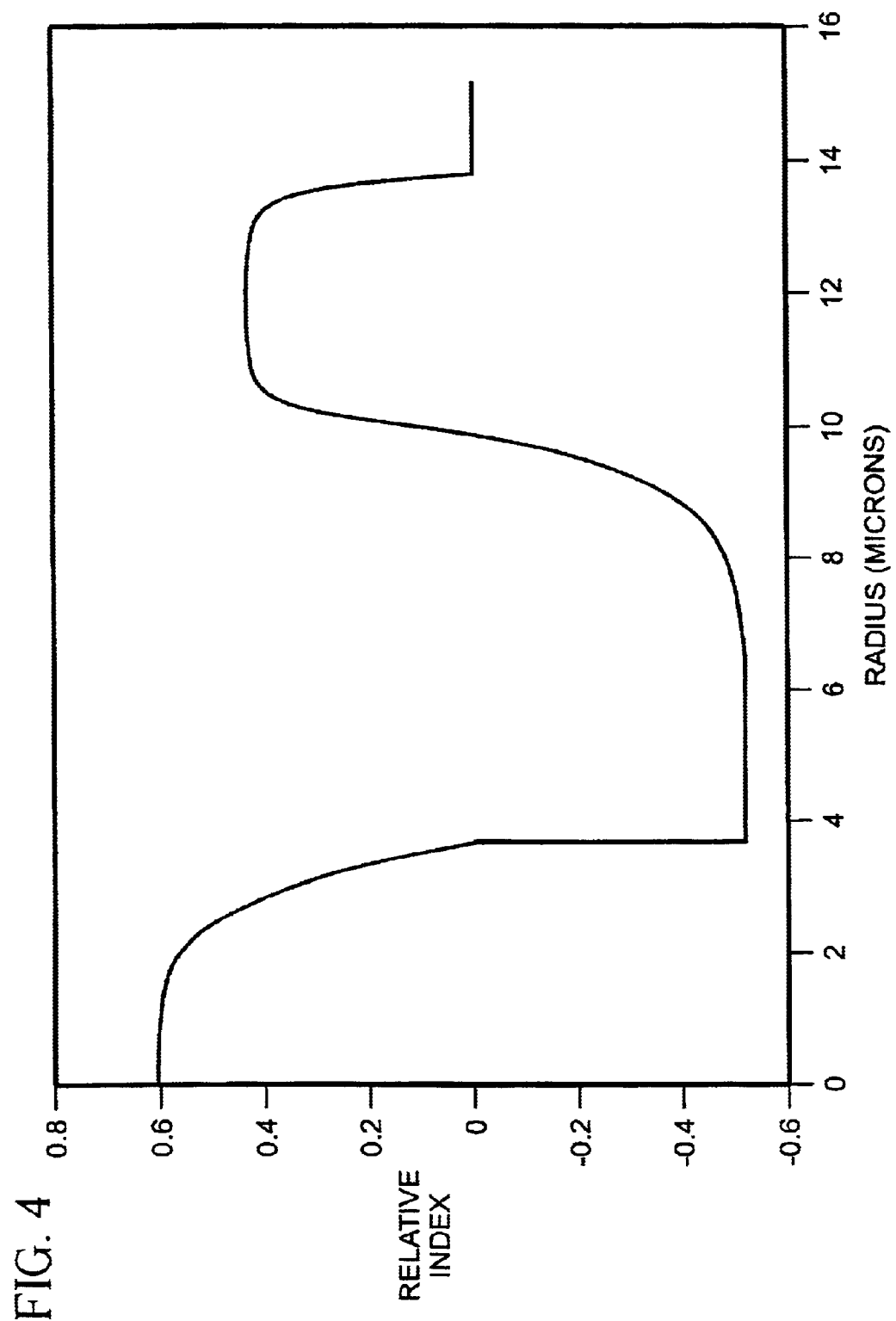
FIG. 4 is a graph showing a relative index profile of a high negative dispersion waveguide according to a second example of the invention.

FIG. 4 shows the relative index profile of the core region for Example 2. In Example 2, the central segment, moat segment and ring segment outer radii are about 4, 10 and 14 microns, respectively. In this second example, the relative indices of the central segment $\Delta_c\%$, moat segment $\Delta_m\%$ and ring segment $\Delta_T\%$ are about 0.6%, $-0.55\%$ and 0.4%, respectively.

Example 3

Figure 5:
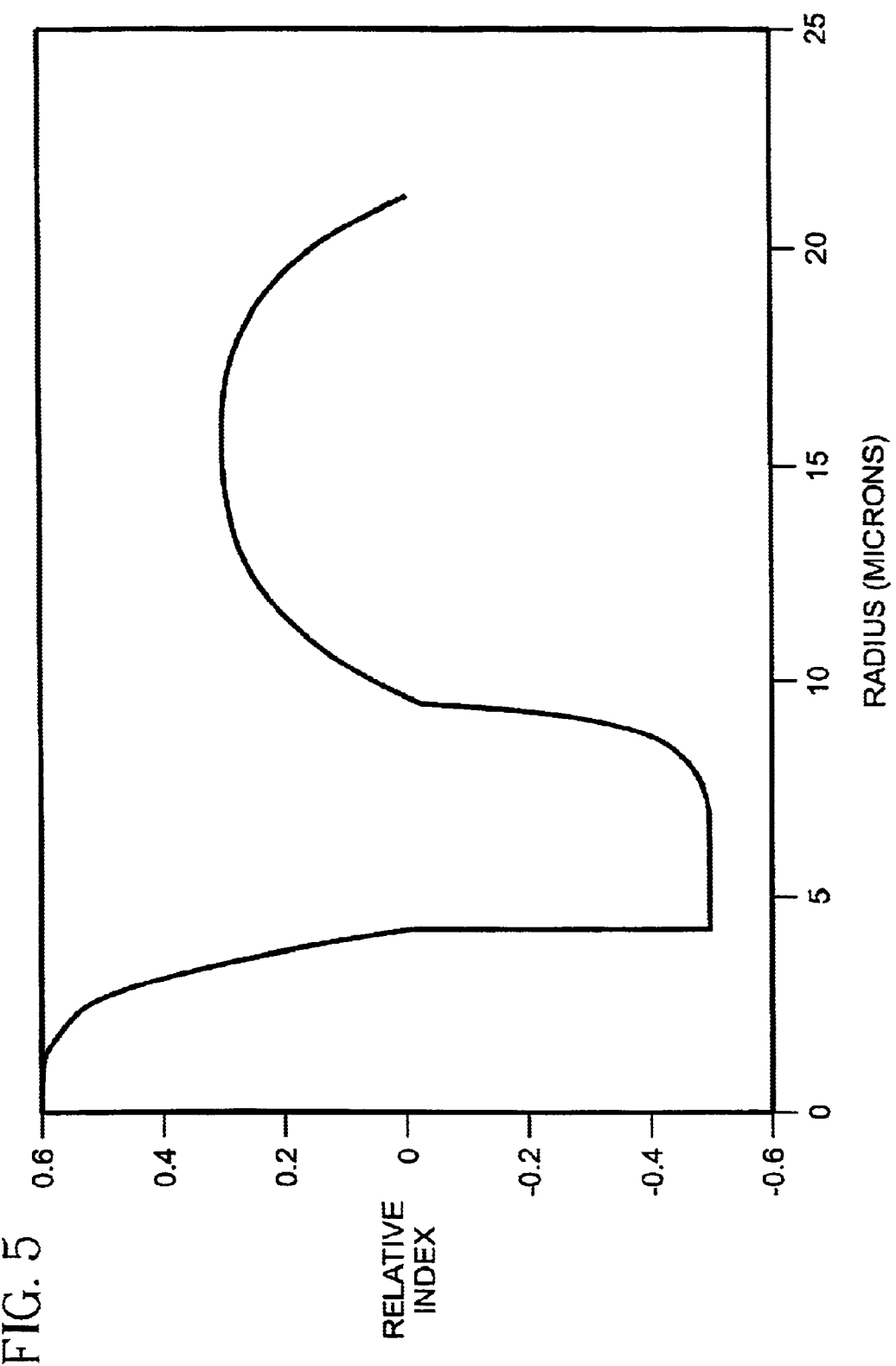
FIG. 5 is a graph showing a relative index profile of a high negative dispersion waveguide according to a third example of the invention.

FIG. 5 shows the relative index profile of the core region for Example 3. In Example 3, the central segment, moat segment and ring segment outer radii are about 4, 9 and 22 microns, respectively. In this third example, the relative indices of the central segment $\Delta_c\%$, moat segment $\Delta_m\%$ and ring segment $\Delta_T\%$ are about 0.6%, −0.55% and 0.3%, respectively.

Table I lists the dispersion, dispersion slope, effective area, and wavelength cutoff for the relative index profiles of the waveguides in Examples 1 to 3.

TABLE I

| Profile | Dispersion (ps/nm–km) | Dispersion slope (ps/nm²–km) | Effective area (microns²) | Cutoff (microns) |
|---|---|---|---|---|
| Exp. 1 | −126 | −11 | 43.9 | 4.57 |
| Exp. 2 | −82 | −5 | 43.7 | 3.03 |
| Exp. 3 | −165 | −25.55 | 47.83 | 5.02 |

As table 1 illustrates, the wavelength cutoff remains above 3 microns for all three examples. For typical fiber transmission applications, the transmission wavelength range is between approximately 1450 nm (1.45 microns) and 1700 nm (1.7 microns). Thus, for typical transmission applications, all three examples show good cutoff values that indicate that the electromagnetic radiation remains substantially confined to the core region. Even for example 2, with a ring section width of only about 4 microns, the cutoff remains above 3. Because the electromagnetic radiation remains substantially confined to the core region, the waveguides of examples 1 to 3 should have low bend loss.

At the same time, the dispersion slope for all three examples is sufficiently high and negative to provide good dispersion slope compensation. Specifically, the dispersion slope in these three examples ranges from −5 to −25.55 ps/nm²-km. Thus, in all three examples, the waveguides have both good dispersion slope compensation and should have low bend loss.

It should be noted that as the negative dispersion slope is increased for a given profile, the wavelength range over which the fiber is useful may decrease quite dramatically. Hence in order to achieve reasonable broadband slope compensation and negative dispersion slopes it is necessary to optimize the profile. For a wavelength range of 32 nm within the C-band (1530–1565 nm) an optimum dispersion slope was found to be around −5 ps/nm²-km.

Figure 6:
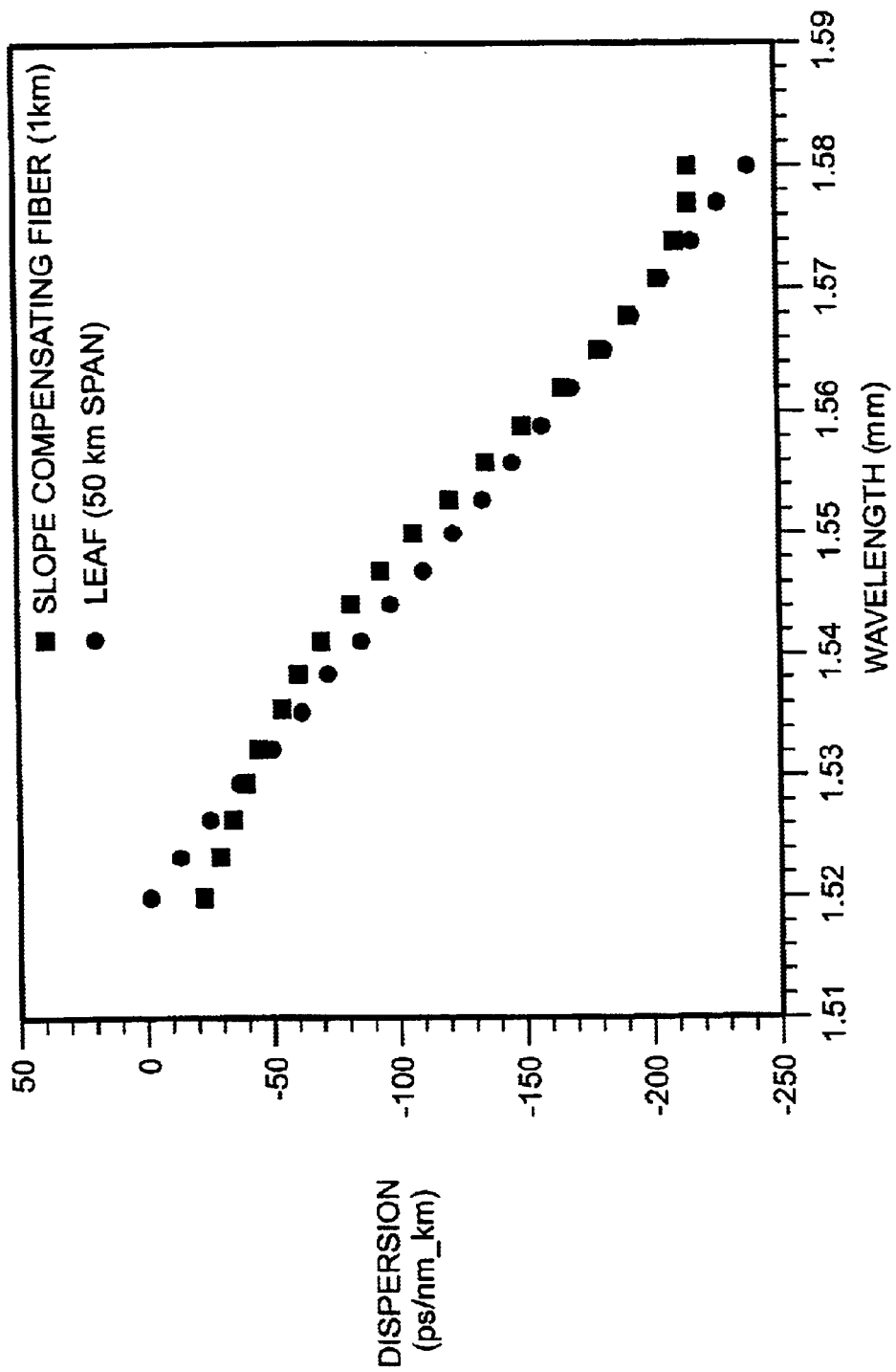
FIG. 6 is a graph showing the dispersion for both a LEAF and a high negative dispersion waveguide of the present invention.

An example of the dispersion slope compensation for this case is illustrated in FIG. 6. FIG. 6 shows the dispersion for both a transmission fiber and a slope compensating fiber. In FIG. 6 it is assumed that the bulk of the dispersion in the transmission fiber has already been compensated by a dispersion compensating waveguide. Thus, the accumulated dispersion of the transmission fiber shown in FIG. 6 has been offset by the amount compensated by the dispersion compensating waveguide. Also, the offset dispersion of the transmission fiber will of course be opposite in sign to the dispersion of the dispersion slope compensating waveguide. However, for ease of illustration, the dispersion of the transmission fiber is shown "flipped", i.e., reversed in sign, so that it can be more easily seen that dispersion of the dispersion slope compensating waveguide compensates the dispersion in the transmission fiber over a wavelength range. In FIG. 6 the relative index profile in FIG. 2 was used as a slope compensating fiber. For FIG. 6, a 50 km section of Python LEAF was compensated by a 1 km section of the dispersion slope compensating fiber.

FIG. 7 is a side view of another embodiment of the invention showing a dual optical waveguide 40. The dual optical waveguide 40 comprises both a dispersion compensating optical waveguide 42 and a dispersion slope compensating optical waveguide 44. The dispersion slope compensating optical waveguide 44 is ranged in series with and is optically coupled to the dispersion compensating waveguide 42. The dual optical waveguide functions to compensate both dispersion (primarily in the dispersion compensating optical waveguide 42) and dispersion slope (primarily in the dispersion slope compensating optical waveguide 44) in separate waveguides. Thus, the present invention offers more flexibility in overall dispersion compensation, because the dispersion and dispersion slope compensation are decoupled.

The dispersion slope compensating optical waveguide 44 may be, for example, the waveguide 10 of the first embodiment or the waveguide 20 of the second embodiment. Of course, the present invention is not limited to dispersion slope compensating optical waveguides 44 of circular cross-section and may have a square or rectangular cross-section, for example.

The dispersion compensating optical waveguide 42 may be, for example, a fiber such as Corning's Pure Mode DCM optical waveguide fiber.

FIG. 8 is a side view of another embodiment of the invention showing an optical waveguide span 50. The optical waveguide span comprises a transmission waveguide 52, a dispersion compensating optical waveguide 54 and a dispersion slope compensating optical waveguide 56. The dispersion compensating optical waveguide 54 is arranged in series with and optically coupled to the transmission waveguide 52. Similarly, the dispersion slope compensating optical waveguide 56 is arranged in series with and optically coupled to the dispersion compensating optical waveguide 54. The dispersion compensating optical waveguide 54 and the dispersion slope compensating optical waveguide 56 act in conjunction to compensate both the dispersion and the dispersion slope of the transmission waveguide 52. Thus, the dispersion compensating optical waveguide 54 and the dispersion slope compensating waveguide 56 act as the dual optical waveguide of the embodiment of FIG. 7.

The dispersion slope compensating optical waveguide 54 may be, for example, the waveguide 10 of the first embodiment or the waveguide 20 of the second embodiment. Of course, the present invention is not limited to dispersion slope compensating optical waveguides 54 of circular cross-section and may have a square or rectangular cross-section, for example. The dispersion compensating optical waveguide 54 may be, for example, a fiber such as Corning's Pure Mode DCM optical waveguide fiber.

The transmission waveguide 52 may be any conventional waveguide which requires both dispersion compensation and dispersion slope compensation. For example, the transmission waveguide 52 may be a LEAF.

Figure 9:
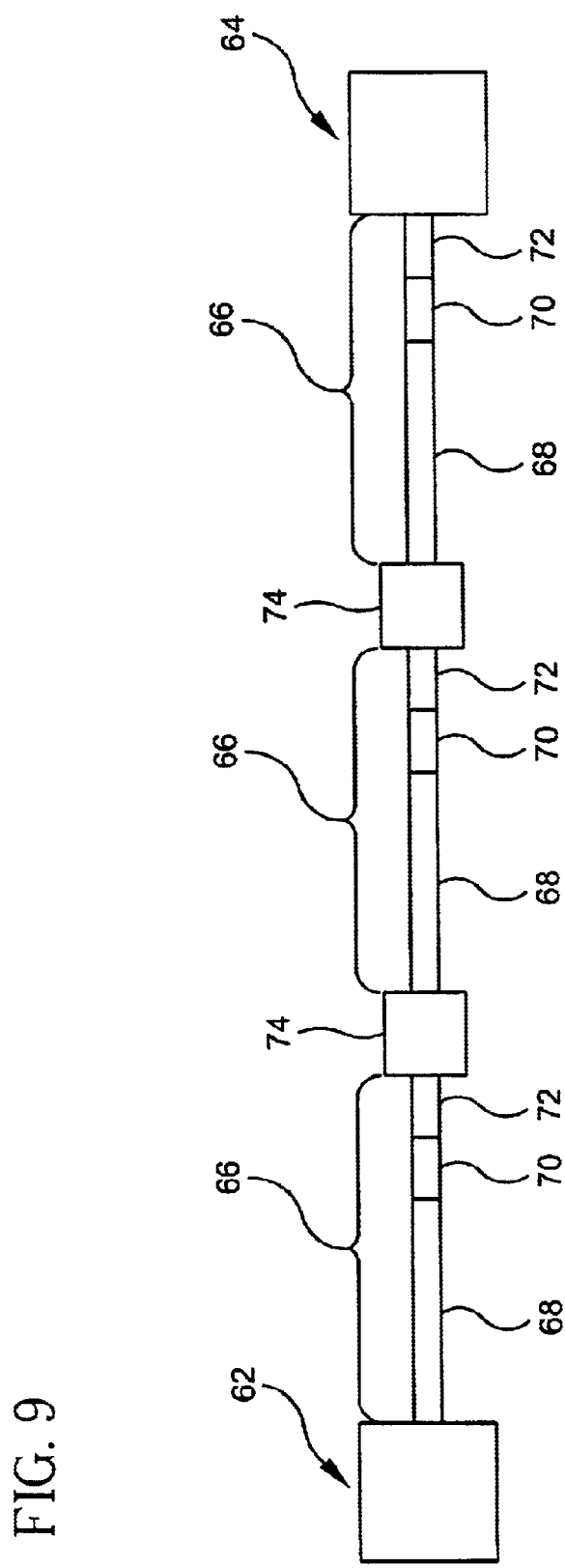
FIG. 9 is a schematic illustrating an optical transmission system according to another embodiment of the invention.

FIG. 9 is a schematic illustrating an optical transmission system 60 according to another embodiment of the invention. The optical transmission system 60 includes a transmitter 62 which transmits light signals to a receiver 64. The transmitter 62 may include, for example, a high powered laser appropriate for telecommunications. The transmitter 62 transmits the light signal into at least one span 66 of fiber. FIG. 9 shows three spans 66. However, the number of spans may be more or less than three and may be a single span. At least one of the spans comprises a transmission waveguide 68, a dispersion compensating optical waveguide 70 and a dispersion slope compensating optical waveguide 72.

The dispersion compensating optical waveguide 70 of a particular span is arranged in series with and is optically coupled to a transmission waveguide 68 of the span. The dispersion slope compensating optical waveguide 72 of a particular span is arranged in series with and is optically coupled to a dispersion compensating optical waveguide 70 of the span. While FIG. 9 shows the dispersion slope compensating optical waveguide 72 of a particular span arranged after the dispersion compensating optical waveguide 70 for that span, the waveguides 72 and 70 may be arranged in either order. The dispersion compensating optical waveguide 70 and the dispersion slope compensating optical waveguide 72 act to compensate, respectively, for the accumulated dispersion and dispersion slope of a respective transmission waveguide 68.

The last span adjacent to the receiver 64 is optically coupled to the receiver 64, and the receiver receives the optical signal from the last span. The transmitter 62 may be, for example, a WDM transmitter. In this case, the receiver should be a WDM receiver.

The optical transmission system 60 may optionally include optical amplifiers 74 between adjacent spans 66 to amplify the light signals as they are transmitted from span to span if amplification is desired or required. The optical amplifiers 74 are optically connected in a series arrangement with the spans 66 and act to periodically amplify the optical signal as it passes through the optical transmission system 60.

While FIG. 9 shows the optical amplifiers 74 arranged between spans 66, in general the compensating optical waveguides may be located inside an amplifier. For example, both the dispersion compensating optical waveguide 70 and the dispersion slope compensating optical waveguide 72 may be arranged within a two stage amplifier with the dispersion compensating optical waveguide 70 and the dispersion slope compensating optical waveguide 72 arranged between the two stages.

While FIG. 9 shows the dispersion slope compensating optical waveguide 72 and the dispersion compensating optical waveguide 70 of a particular span arranged after the transmission waveguide 68 for that span, the waveguides 72 and 70 may be arranged either before or after the transmission waveguide of a particular span. Preferably, the waveguides are arranged such that the optical signal has sufficient accumulated dispersion upon amplification to avoid FWM non-linear effects. In this regard, the accumulated dispersion should be brought near zero only after amplification.

The waveguide arranged just before the receiver need not be a dispersion slope compensating optical waveguide. For example, it may be desired in some applications to trip some dispersion just before the receiver.

The system may transmit, for example, such that the transmitter launches the optical signal directly into the transmission waveguide and the receiver receives the optical signal directly from the dispersion slope compensating optical waveguide.

The dispersion slope compensating optical waveguide 72 may be, for example, the waveguide 10 of the first embodiment or the waveguide 20 of the second embodiment. Of course, the present invention is not limited to dispersion slope compensating optical waveguides 72 of circular cross-section and may have a square or rectangular cross-section, for example.

The dispersion compensating waveguide 70 may be, for example, a fiber such as Corning's Pure Mode DCM optical waveguide fiber.

The transmission waveguide 68 may be any conventional waveguide which requires both dispersion compensation and dispersion slope compensation. For example, the transmission waveguide may be a LEAF.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

What is claimed is:

1. A dispersion slope compensating optical waveguide having a negative dispersion slope, the waveguide comprising:
   a core region; and
   a clad layer;
   wherein the core region comprises a first region and a second region, the second region surrounding the first region and having a width to confine electromagnetic radiation within a selected wavelength range to substantially only the core region,
   wherein the negative dispersion slope of the waveguide is in the range of $-2$ ps/nm$^2$-km to $-40$ ps/nm$^2$-km over the selected wavelength range.

2. The dispersion slope compensating optical waveguide of claim 1, wherein the negative dispersion slope is in the range of $-5$ ps/nm$^2$-km to $-26$ ps/nm$^2$-km over the selected wavelength range.

3. The dispersion slope compensating optical waveguide of claim 1, wherein the selected wavelength range includes 1550 nm.

4. The dispersion slope compensating optical waveguide of claim 3, wherein the selected wavelength range is about 1450 nm to 1700 nm.

5. The dispersion slope compensating optical waveguide of claim 3, wherein the selected wavelength range is about 1470 nm to 1640 nm.

6. The dispersion slope compensating optical waveguide of claim 1, wherein the core has a central axis and each of the first region and the second region has an axis collinear with the central axis.

7. The dispersion slope compensating optical waveguide of claim 6, wherein the second region has an inner radius and an outer radius and the difference therebetween is in the range of about 6 to about 20 microns.

8. The dispersion slope compensating optical waveguide of claim 6, wherein the second region has a relative index $\Delta_2\%$, and the first region comprises:
   a central segment having an outer radius, an axis collinear with the central axis, and a relative index $\Delta_c\%$ of a same sign as the second region relative index $\Delta_2\%$; and
   a moat segment surrounding the central segment and having an outer radius, an inner radius, an axis collinear with the central axis, and a relative index $\Delta_m\%$ that is opposite in sign to the central segment relative index $\Delta_c\%$.

9. A dispersion slope compensating optical waveguide having a negative dispersion slope, the waveguide comprising:
   a core region having a central axis; and
   a clad layer;
   wherein the core region comprises, a central segment, a moat segment, and a ring segment, each segment having an outer radius and an axis collinear with the central axis, the moat and ring segments each having an inner radius,
   the central segment located about the central axis and having a relative index $\Delta_c\%$;

the moat segment located about the central segment and having a relative index $\Delta_m\%$ opposite in sign to the relative index $\Delta_c\%$ of the central segment;

the ring segment located about the moat segment and having a relative index $\Delta_T\%$ of the same sign as the relative index $\Delta_c\%$ of the central segment, the difference between the ring segment outer radius and the ring segment inner radius confining electromagnetic radiation within a selected wavelength range to substantially only the core region, the negative dispersion slope being in the range of $-2$ ps/nm$^2$-km to $-40$ ps/nm$^2$-km over the selected wavelength range.

10. The dispersion slope compensating optical waveguide of claim 9, wherein the difference between the ring segment outer radius and the ring segment inner radius is in the range of about 6 to about 20 microns.

11. The dispersion slope compensating optical waveguide of claim 9, wherein each of the central, moat and ring segments has a respective refractive index profile, the refractive index profiles having a respective shape selected from the group consisting of an α-profile, a step, a rounded step, a trapezoid, and a rounded trapezoid.

12. The dispersion slope compensating optical waveguide of claim 11, wherein the respective refractive index profiles of the central and moat segments are α-profiles with an α value of about 4.

13. The dispersion slope compensating optical waveguide of claim 9, wherein the negative dispersion slope is in the range of $-5$ ps/nm$^2$-km to $-26$ ps/nm$^2$-km over the selected wavelength range.

14. The dispersion slope compensating optical waveguide of claim 9, wherein the central segment has a relative index $\Delta_c\%$ in the range of about 0.4% to 0.8%;

the moat segment has a relative index $\Delta_m\%$ in the range of about $-0.5\%$ to $-0.7\%$; and the ring segment has a relative index $\Delta_T\%$ in the range of about 0.1% to 0.4%, the ring segment inner radius being in the range of about 6.5 microns to 12.5 microns, the difference between the ring segment outer radius and the ring segment inner radius being in the range of about 2 to about 20 microns.

15. The dispersion compensating optical waveguide of claim 9, wherein the selected wavelength range includes 1550 nm.

16. The dispersion slope compensating optical waveguide of claim 15, wherein the selected wavelength range is about 1450 nm to 1700 nm.

17. The dispersion slope compensating optical waveguide of claim 14, wherein the difference between the ring segment outer radius and the ring segment inner radius is in the range of about 6 to 20 microns.

18. The dispersion slope compensating optical waveguide of claim 14, wherein the central segment outer radius is in the range of about 3 to 6 microns.

19. The dispersion slope compensating optical waveguide of claim 14, wherein the difference between the moat segment outer and inner radius is in the range of about 3.5 microns to 6.5 microns.

20. The dispersion slope compensating optical waveguide of claim 14, wherein the central segment outer radius is about 4 microns, the moat segment outer radius is about 8 microns, and the ring segment outer radius is about 18 microns.

21. The dispersion slope compensating optical waveguide of claim 20, wherein the central segment has a relative index $\Delta_c\%$ of about 0.6%, the moat segment has a relative index $\Delta_m\%$ of about $-0.55\%$, and ring segment has a relative index $\Delta_T\%$ of about 0.3%.

22. The dispersion slope compensating optical waveguide of claim 14, wherein the central segment outer radius is about 4 microns, the moat segment outer radius is about 10 microns, and the ring segment outer radius is about 14 microns.

23. The dispersion slope compensating optical waveguide of claim 22, wherein the central segment has a relative index $\Delta_c\%$ of about 0.6%, the moat segment has a relative index $\Delta_m\%$ of about $-0.55\%$, and ring segment has a relative index $\Delta_T\%$ of about 0.4%.

24. The dispersion slope compensating optical waveguide of claim 14, wherein the central segment outer radius is about 4 microns, the moat segment outer radius is about 9 microns, and the ring segment outer radius is about 22 microns.

25. The dispersion slope compensating optical waveguide of claim 24, wherein the central segment has a relative index $\Delta_c\%$ of about 0.6%, the moat segment has a relative index $\Delta_m\%$ of about $-0.55\%$, and ring segment has a relative index $\Delta_T\%$ of about 0.3%.

26. A dual optical waveguide, comprising:

a dispersion compensating optical waveguide; and a dispersion slope compensating optical waveguide arranged in series with and optically coupled to the dispersion compensating optical waveguide, the dispersion slope compensating waveguide comprising:

a core region having a central axis; and a clad layer;

wherein the core region comprises, a central segment, a moat segment, and a ring segment, each segment having an outer radius and an axis collinear with the central axis, the moat and ring segments each having an inner radius, the central segment located about the central axis and having a relative index $\Delta_c\%$;

the moat segment located about the central segment and having a relative index $\Delta_m\%$ opposite in sign to the relative index $\Delta_c\%$ of the central segment;

the ring segment located about the moat segment and having a relative index $\Delta_T\%$ of the same sign as the relative index $\Delta_c\%$ of the central segment, the difference between the ring segment outer radius and the ring segment inner radius confining electromagnetic radiation in a selected wavelength range to substantially only the core region, the negative dispersion slope being in the range of $-2$ ps/nm$^2$-km to $-40$ ps/nm$^2$-km over the selected wavelength range.

27. An optical waveguide span comprising:

a transmission waveguide;

a dispersion compensating optical waveguide arranged in series with and optically coupled to the transmission waveguide; and a dispersion slope compensating optical waveguide arranged in series with and optically coupled to the dispersion compensating optical waveguide, the dispersion slope compensating waveguide comprising:

a core region having a central axis; and a clad layer;

wherein the core region comprises, a central segment, a moat segment, and a ring segment, each segment having an outer radius and an axis collinear with the central axis, the moat and ring segments each having an inner radius, the central segment located about the central axis and having a relative index $\Delta_c\%$;

the moat segment located about the central segment and having a relative index $\Delta_m\%$ opposite in sign to the relative index $\Delta_c\%$ of the central segment;

the ring segment located about the moat segment and having a relative index $\Delta_T\%$ of the same sign as the relative index $\Delta_c\%$ of the central segment, the difference between the ring segment outer radius and the ring segment inner radius confining electromagnetic radiation in a selected wavelength range to substantially only the core region, the negative dispersion slope being in the range of $-2$ ps/nm$^2$-km to $-40$ ps/nm$^2$-km over the selected wavelength range.

28. The optical waveguide span of claim 27, wherein the transmission waveguide is a large effective area fiber.

29. A optical transmission system transmitting in a selected wavelength range including 1550 nm, the system comprising:

a transmission waveguide;

a dispersion compensating optical waveguide arranged in series with and optically coupled to the transmission waveguide; and a dispersion slope compensating optical waveguide arranged in series with and optically coupled to the dispersion compensating optical waveguide;

a transmitter optically coupled to the transmission waveguide, wherein the transmitter launches an optical signal into the transmission waveguide in the selected wavelength range; and a receiver optically coupled to the dispersion slope compensating waveguide, wherein the receiver receives the optical signal from the dispersion slope compensating optical waveguide;

wherein the dispersion slope compensating optical waveguide comprises:

a core region having a central axis; and a clad layer;

wherein the core region comprises, a central segment, a moat segment, and a ring segment, each segment having an outer radius and an axis collinear with the central axis, the moat and ring segments each having an inner radius, the central segment located about the central axis and having a relative index $\Delta_c\%$;

the moat segment located about the central segment and having a relative index $\Delta_m\%$ opposite in sign to the relative index $\Delta_c\%$ of the central segment;

the ring segment located about the moat segment and having a relative index $\Delta_T\%$ of the same sign as the relative index $\Delta_c\%$ of the central segment, the difference between the ring segment outer radius and the ring segment inner radius confining electromagnetic radiation in a selected wavelength range to substantially only the core region, the negative dispersion slope being in the range of $-2$ ps/nm$^2$-km to $-40$ ps/nm$^2$-km over the selected wavelength range.

30. The optical transmission system of claim 29, wherein the transmitter launches the optical signal directly into the transmission waveguide.

31. The optical transmission system of claim 29, wherein the receiver receives the optical signal directly from the dispersion slope compensating optical waveguide.

* * * * *

UNITED STATES PATENT AND TRADEMARK OFFICE
CERTIFICATE OF CORRECTION

PATENT NO. : 6,882,787 B2
DATED : April 19, 2005
INVENTOR(S) : V. Srikant

It is certified that error appears in the above-identified patent and that said Letters Patent is hereby corrected as shown below:

Column 11,
Lines 5 and 38, "$\Delta_T\%$" should be -- $\Delta_r\%$ --.

Column 12,
Lines 3, 13, 23 and 43, "$\Delta_T\%$" should be -- $\Delta_r\%$ --.

Column 13,
Line 7, "$\Delta_T\%$" should be -- $\Delta_r\%$ --.

Column 14,
Line 18, "$\Delta_T\%$" should be -- $\Delta_r\%$ --.

Signed and Sealed this

Sixteenth Day of August, 2005

JON W. DUDAS
*Director of the United States Patent and Trademark Office*